(12) United States Patent
Jung

(10) Patent No.: US 6,848,164 B2
(45) Date of Patent: Feb. 1, 2005

(54) MAGNET FIXING METHOD OF A LINEAR SERVO MOTOR

(75) Inventor: Hun-Taek Jung, Hanam (KR)

(73) Assignee: Soonhan Engineering, Inc., Sungnam (KR)

( * ) Notice: Subject to any disclaimer, the term of this patent is extended or adjusted under 35 U.S.C. 154(b) by 112 days.

(21) Appl. No.: 10/154,058

(22) Filed: May 22, 2002

(65) Prior Publication Data

US 2002/0175793 A1 Nov. 28, 2002

(30) Foreign Application Priority Data

May 22, 2001 (KR) ........................................ 2001-27965
May 9, 2002 (KR) ........................................ 2002-25560

(51) Int. Cl.[7] ........................ H02K 15/00; H02K 15/14; H02K 15/16
(52) U.S. Cl. ............................ 29/596; 29/598; 29/605; 29/606; 29/607; 29/712; 310/12; 310/156.45; 335/306
(58) Field of Search .......................... 29/596, 598, 605, 29/606, 712, 607; 310/12, 156.45; 335/306

(56) References Cited

U.S. PATENT DOCUMENTS

| | | | |
|---|---|---|---|
| 4,012,651 A | * | 3/1977 | Burson ........................ 310/153 |
| 5,751,075 A | * | 5/1998 | Kwon et al. .................... 310/12 |
| 6,097,125 A | * | 8/2000 | Park et al. ............. 310/156.45 |

\* cited by examiner

*Primary Examiner*—Carl J. Arbes
*Assistant Examiner*—Tim Phan
(74) *Attorney, Agent, or Firm*—Gordon & Rees; Gordon & Rees LLP

(57) ABSTRACT

A magnet fixing method of a linear servo motor wherein a cage for simultaneously securing positions and angles of a plurality of magnets is injection-molded where the cage is utilized to fix the magnets such that productivity is improved to shorten the working hours and reduce the manufacturing cost. A mutual twisting phenomenon can be prevented by interacting magnetic force among the plurality of magnets to thereby reduce the rate of defects.

4 Claims, 7 Drawing Sheets

MAGNET FIXING METHOD OF A LINEAR SERVO MOTOR

CROSS-REFERENCES TO RELATED DOCUMENT

This present application claims the benefit of Korean Applications 2001-0027965 and 2002-0025560, which were filed on $22^{nd}$ May 2001 and $9^{th}$ May 2002.

FIELD OF THE INVENTION

The present invention relates to a magnet fixing method used of a linear servo motor adapted to properly arrange and fix a magnet for a linear servo motor.

DESCRIPTION OF THE PRIOR ART

Generally, linear motors have been used for XY tables and the like as they are made of simple construction and capable of performing an accurate position control.

A conventional stage of a linear servo motor includes, as illustrated in FIG. 1, a plurality of magnets 3 alternatively arranged (N, S, N, S . . . ) at an upper central position of a stator body 1 each at a predetermined space therebetween along a lengthwise direction of the stage via a pure iron plate 23, a pair of guide rails 5 each secured at left and right upper ends of the stator body 1 along the lengthwise direction of the stage, a pair of slid blocks 9 each slidably secured at left and right upper surfaces of the pair of guide rails 5 along a lengthwise direction of the stage, a mover body 7 fixed to an upper surface of the pair of slide blocks 9, a coil unit 11 mounted at a central bottom surface of the mover body 7 by a plurality of bolts 19, a bottom surface of which being detached from the plurality of magnets at a predetermined distance, and a cover member 17 secured at an upper surface of the stator body 1 for maintaining the horizontality thereof.

As a fixing method of the plurality of magnets 3, the bottom surface of the magnets 3 is fixed to the upper surface of the pure iron plate 23 so as to be alternatively arranged (N, S, N, S . . . ) each at a predetermined interval along the lengthwise direction of the stage, as illustrated in FIG. 2, and molded by molding member 25 of epoxy resin or the like along a circumferential side of the plurality of magnets 3 glued to the upper surface of the pure iron plate 23.

However, there is a problem in the magnet fixing method of a linear servo motor thus described according to the prior art in that the plurality of magnets 3 are adhered at the bottom surface thereof to the upper surface of the pure iron plate 23 by way of adhesives, such that it takes much time to glue each magnet 3, and when the plurality of magnets 3 are glued and arranged each at a desired position and at a predetermined angle, the magnets 3 are twisted by a magnetic force mutually acting thereamong and the positions and angles of the magnets 3 are changed, thereby resulting in frequent occurrence of defects.

There is still another problem in that the upper surface of the pure iron plate 23 is respectively adhered by the plurality of magnets 3 while circumferential sides of the plurality of magnets are again fixed by the molding member 25 of epoxy resin or the like, such that much labor is required due to many processes involved therein, resulting in the increase of manufacturing cost.

SUMMARY OF THE INVENTION

The present invention provides a magnet fixing method of a linear servo motor wherein a cage for simultaneously setting up positions and angles of a plurality of magnets is manufactured by injection molding in order to fix the magnets by using the cage, resulting in improved work efficiency, and minimal work hours and manufacturing cost as well.

Another object is to prevent twisting caused by mutual magnetic force generated by the plurality of magnets to eliminate defects.

In accordance with the present invention, there is provided a magnet fixing method of a linear servo motor, the motor comprising a stator composed of a plurality of magnets coupled to an upper surface of a stator body via a pure iron plate and a mover composed of a coil unit coupled to a lower surface of a mover body whereby the mover is horizontally moved on the stator by thrusts induced from the coil unit and the plurality of magnets, the method comprising the steps of:

injection-molding a cage formed with a plurality of insert holes on a continuous base along a lengthwise direction of a stage at a predetermined interval;

mounting the cage on the pure iron plate; and alternatively inserting the plurality of magnets into the plurality of insert holes formed at the cage to adhere the plurality of magnets by way of adhesives.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

Figure 1:
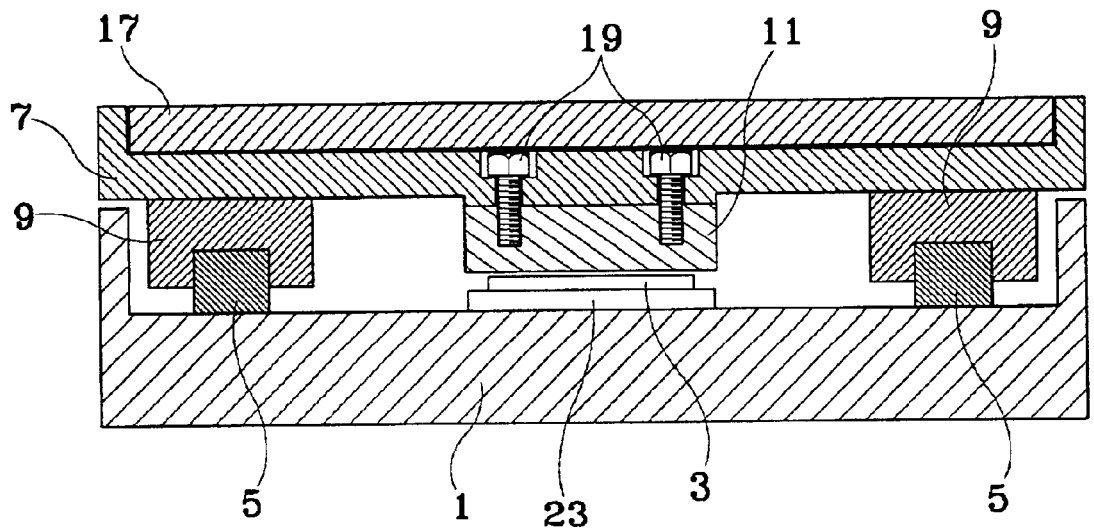
FIG. 1 is a lateral cross-sectional view illustrating a state of a linear servo motor according to the prior art.
Figure 2:
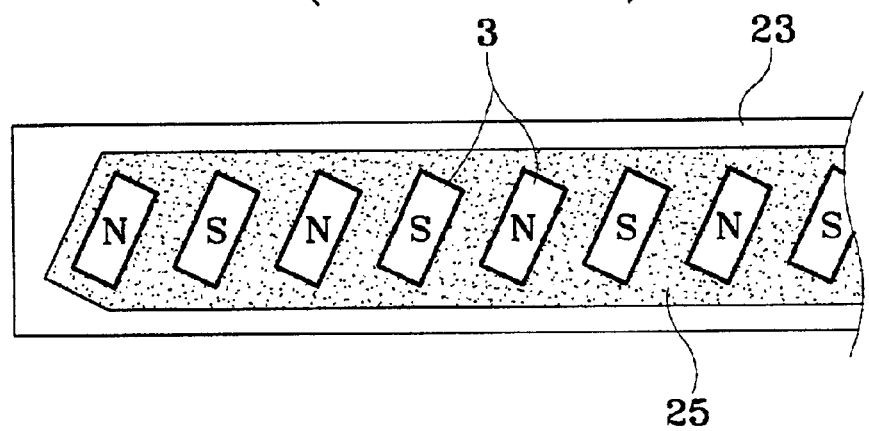
FIG. 2 is a plan view illustrating a magnet fixing method of a linear servo motor according to the prior art.

Now, preferred embodiments of the present invention will be described in detail with reference to the accompanying drawings.

Throughout the drawings, like reference numerals will be used for designation of like or equivalent parts or portions for simplicity of illustration and explanation.

Figure 3:
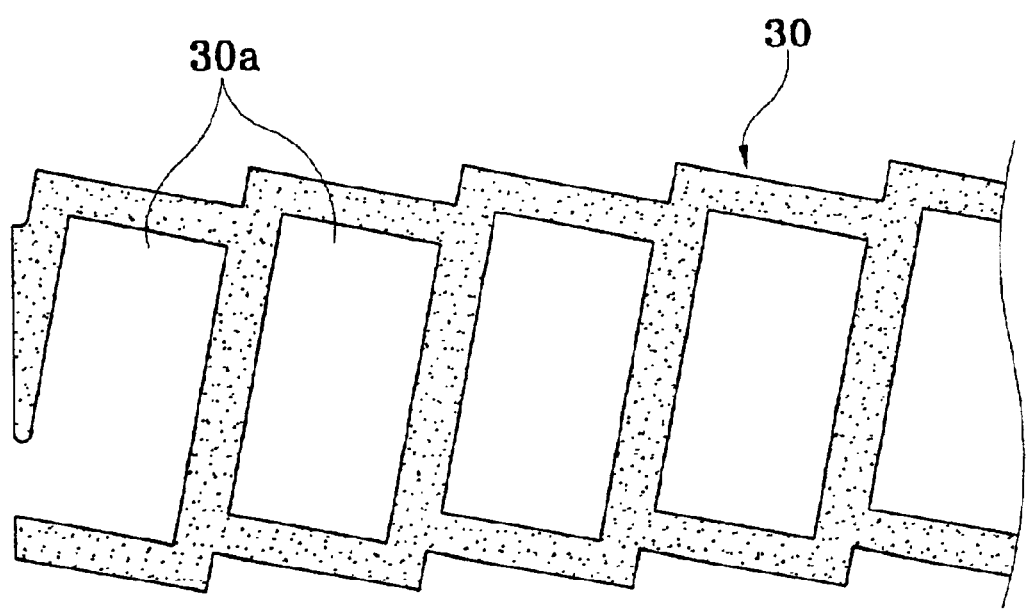
FIG. 3 is a plan view illustrating an injection-molded cage according to the present invention.
Figure 4:
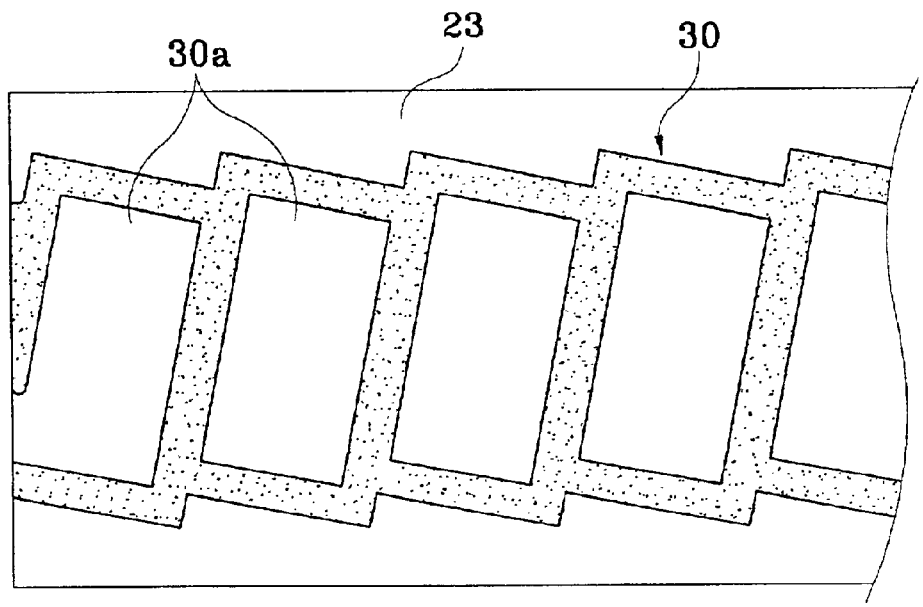
FIG. 4 is a plan view illustrating a status where the cage shown in FIG. 3 is mounted to the pure iron plate.
Figure 5:
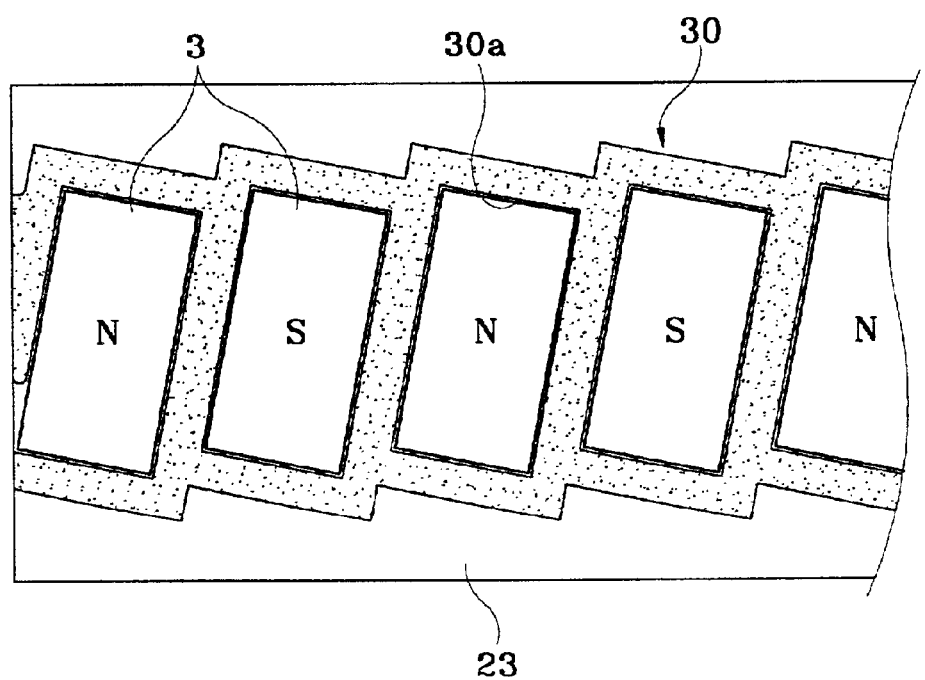
FIG. 5 is a plan view illustrating a status where the magnets are adhered under the state shown in FIG. 4.

As shown in FIGS. 3, 4 and 5, the magnet fixing method of a linear servo motor according to a first present invention includes the steps of:

injection-molding a cage 30 formed with a plurality of insert holes 30a on a continuous base along a lengthwise direction of a stage at a predetermined interval (FIG. 3);

mounting the cage 30 on a pure iron plate 23 (FIG. 4); and alternatively (N, S, N, S . . . ) inserting the plurality of magnets 3 into the plurality of insert holes 30a formed at the cage 30 to adhere same by way of adhesives (FIG. 5).

It is preferable that the pure iron plate 23 is made of a carbon steel having less than 0.1% of carbon content, but a lesser purity of pure iron plate may be used.

The plurality of insert holes 30a are arranged lengthwise along the stage such that the plurality of magnets 3 can be alternatively (N, S, N, S . . . ) inserted thereinto and slantly arranged with a predetermined angle.

It is preferable that, when the plurality of magnets 3 are inserted into the plurality of insert holes 30a, small fine gaps exist between an inner circumferential surface of the insert holes 30a and an outer circumferential surface of the magnets 3 such that when the magnets 3 are adhered to the pure iron plate 23, adhesives used thereto slip into the gaps to allow the magnets 3 and the cages 30 to stick firmly at the same time, thereby enabling to embody a securely fixed state therebetween.

As shown in FIGS. 6 to 10 describing the second and third embodiments, the magnet fixing method of a linear servo motor includes the steps of:

injection-molding a cage 31 or 32 formed with a plurality of insert holes 31a or 32a continuously arranged along the lengthwise direction of a stage each at a predetermined interval;

coupling a plurality of magnets 3 into the plurality of insert holes 31a or 32a formed at the cage 31 or 32 on an alternative method; and attaching a floor surface of the cage 31 or 32 and floor surfaces of the plurality of the magnets 3 assembled by the above coupling step to an upper surface of a pure iron plate 23 simultaneously by way of adhesives.

The plurality of insert holes 31a or 32a injection-molded in the present embodiment are so formed as to allow the magnets to be push-fitted thereinto such that the present embodiment is different from the first embodiment in that the cage 31 or 32 and the magnets 3 are attached at the same time onto the pure iron plate 23 while the cage 31 or 32 and the magnets 3 are previously coupled by way of push-fitted fashion.

Figure 9:
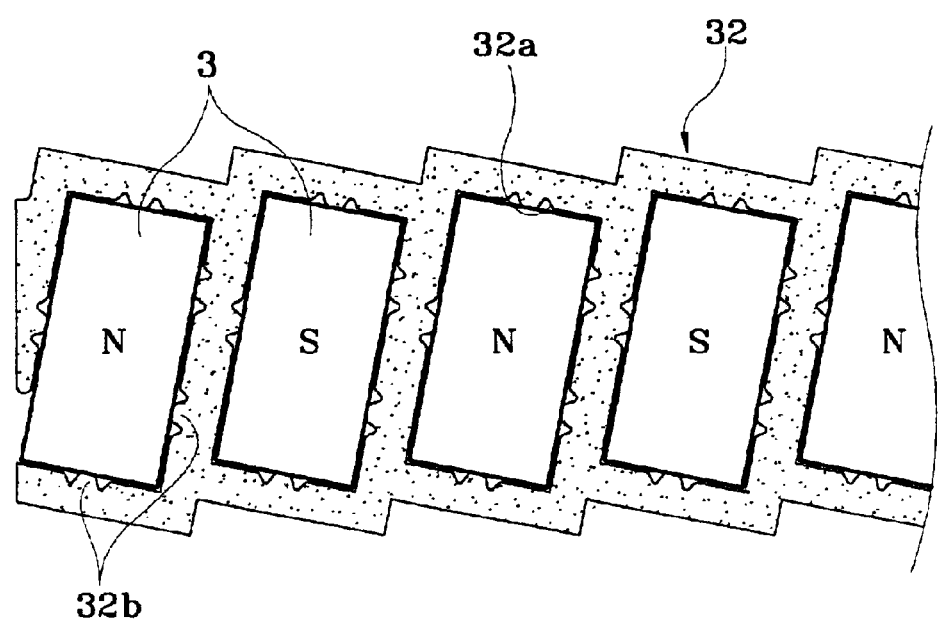
FIG. 9 is a plan view illustrating a status where magnets are coupled to a cage shown in FIG. 8.

As a result, in order to utilize the method by the second and third embodiments, the insert holes 31a at the cage 31 injection-molded at the molding process are made a little smaller in size thereof than those of the magnets 3 which are to be inserted thereinto, whereby the magnets 3 are push-fitted into the plurality of insert holes 31a in the coupling process (refer to FIG. 6), or the insert holes 32a at the cage 32 injection-molded at the molding process are provided with a plurality of prominences and depressions 32b (refer to FIG. 8), whereby the magnets 3 are forcibly inserted into the prominences and depressions 32b (refer to FIG. 9).

Figure 6:
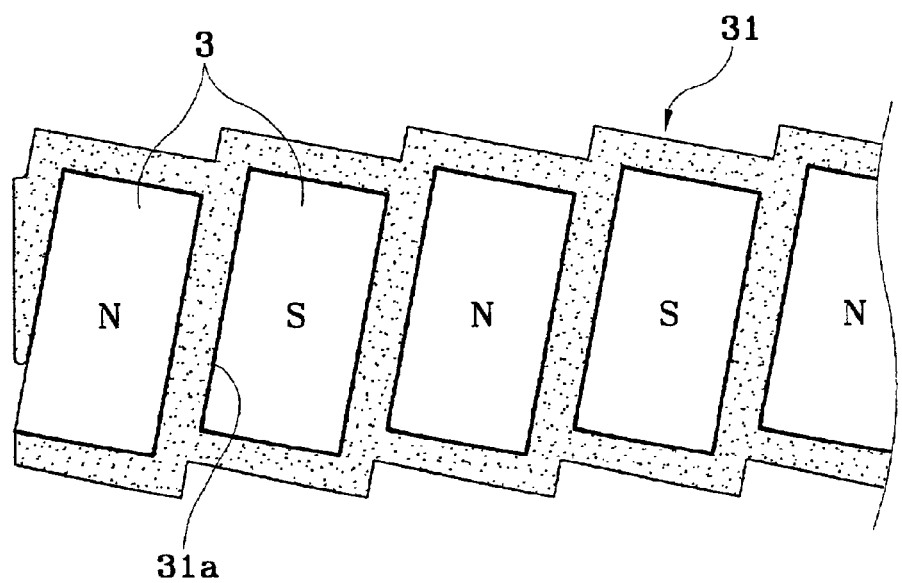
FIG. 6 is a plan view of a second embodiment of the present invention where magnets are tight-fitted into a cage.
Figure 7:
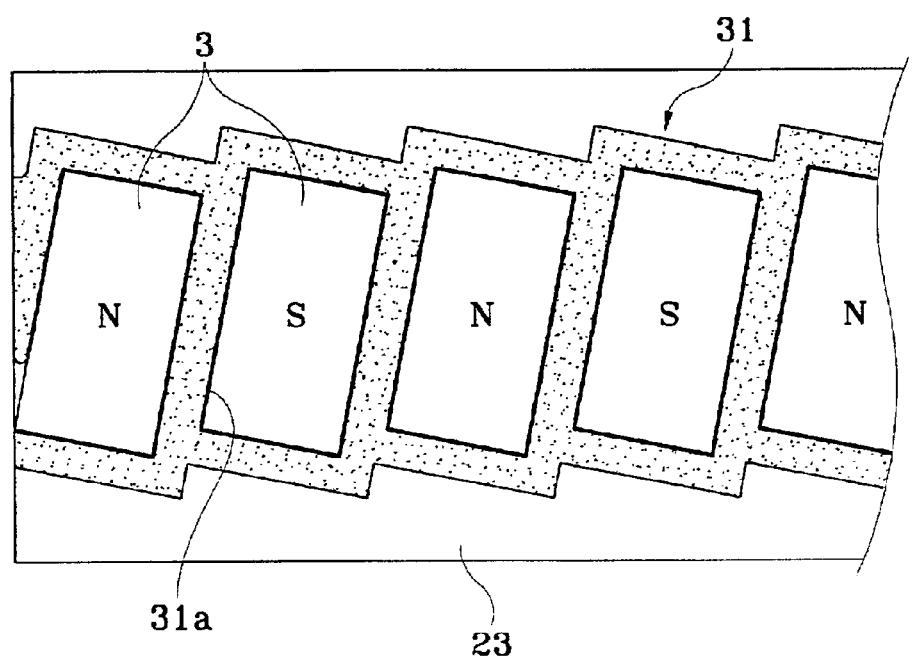
FIG. 7 is a plan view illustrating the magnets and cage shown in FIG. 6 glued to a pure iron plate at the same time.
Figure 8:
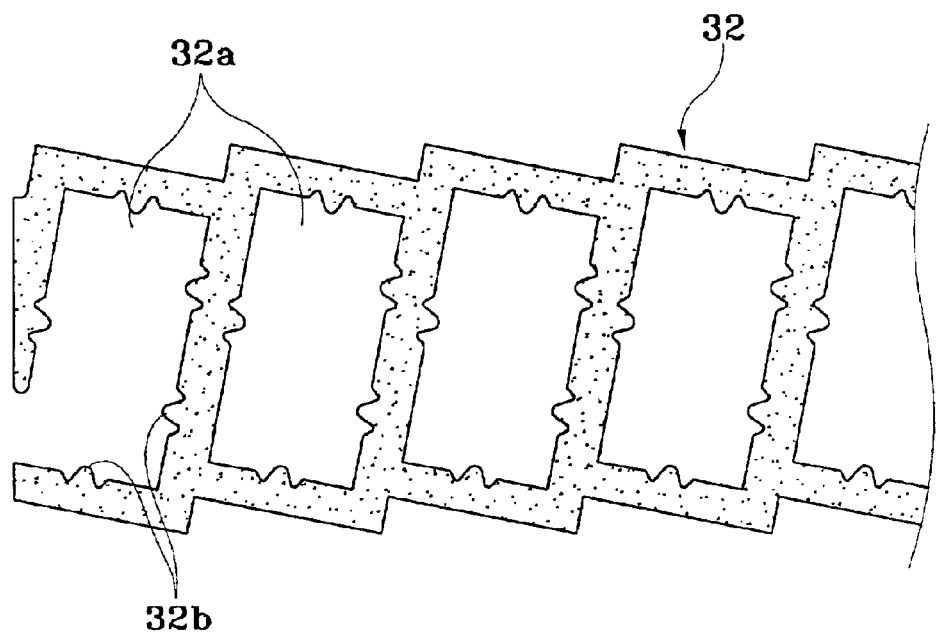
FIG. 8 is a plan view of a third embodiment of the present invention, where a cage is formed with a plurality of protruders in insert grooves.
Figure 10:
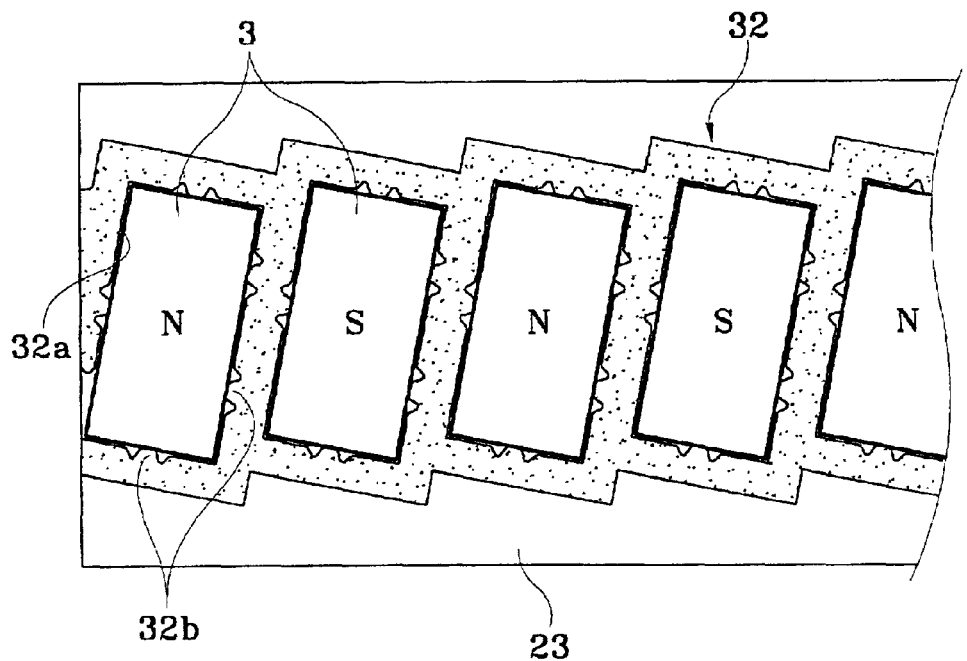
FIG. 10 is a plan view illustrating a status where the cage shown in FIG. 8 and magnets are all glued to a pure iron plate at the same time.

FIG. 7 illustrates the magnets 3 and the cage 31, coupled in same state as in FIG. 6, being glued onto the pure iron plate 23 all at once, while FIG. 10 illustrates the magnets 3 and the cage 32, coupled in the same state as in FIG. 9, being glued onto the pure iron plate 23 all at once.

Now, a fourth embodiment of the present invention will be described in FIGS. 11 to 14.

In the fourth embodiment, the magnet fixing method of a linear servo motor comprises the steps of:

injection-molding a cage 33 formed with a plurality of insert grooves 33a arranged continuously along the lengthwise direction of a stage each at a predetermined interval;

alternatively coupling (N, S, N, S . . . ) a plurality of magnets 3 to a plurality of insert grooves 33a formed at the cage 33; and gluing a bottom surface of the cage 33 and a bottom surface of a plurality of magnets 3 assembled by the aforementioned coupling process onto an upper surface of a pure iron plate 23 by way of adhesives.

The fourth embodiment is different from the aforementioned embodiments in that the cage 33 injection-molded at the molding process is not formed with the insert holes but formed with insert grooves 33a to allow a cover 33c to protect the magnets 3 to be formed all by itself.

Figure 11:
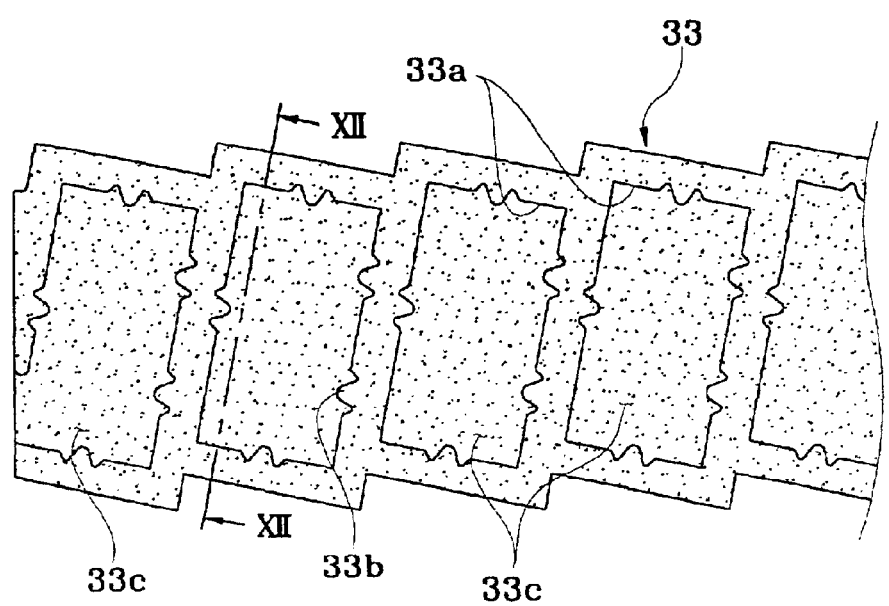
FIG. 11 is a plan view illustrating a cage formed with a plurality of insert grooves in which magnets are inserted according to a fourth embodiment of the present invention.
Figure 12:
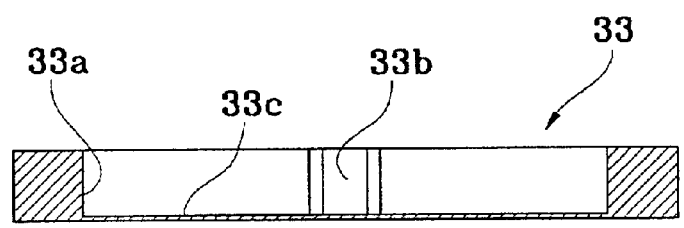
FIG. 12 is a cross-sectional view taken along line XII—XII of FIG. 11.
Figure 13:
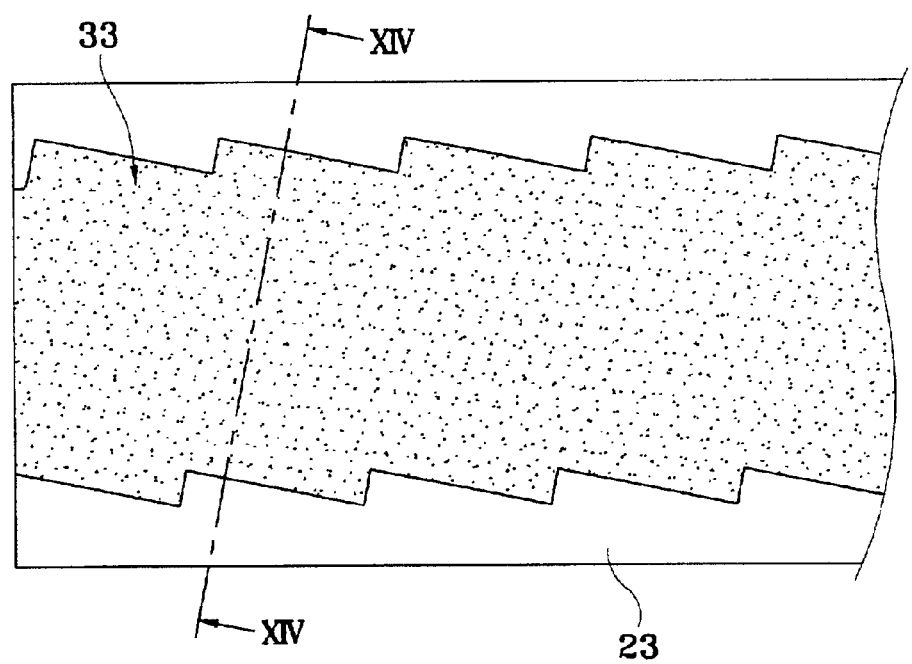
FIG. 13 is a plan view illustrating the cage shown in FIG. 11 being coupled to magnets and adhered to the pure iron plate.
Figure 14:
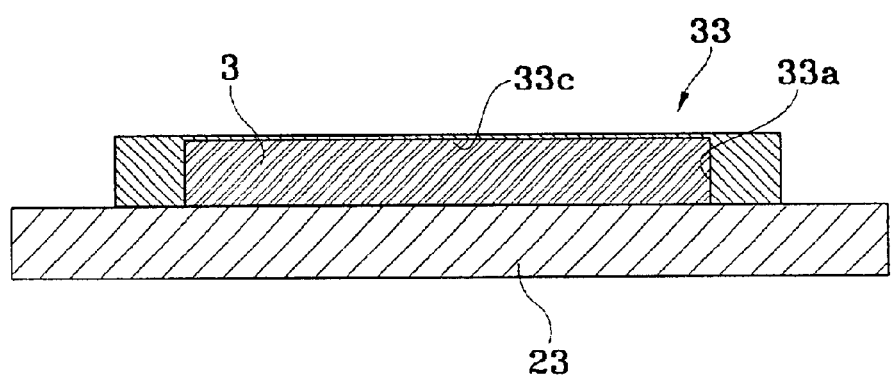
FIG. 14 is a cross-sectional view taken along line XIV—XIV of FIG. 13.

As shown in FIGS. 11 and 12, the insert grooves 33a are placed at the cage 33 as deep as the magnets can be inserted without penetrating the cage, such that, when the magnets 3 are coupled to the cage and when a side where the insert grooves 33a at the cage 33 are formed is attached to the upper surface of the pure iron plate 23 along with the magnets 3, the magnets 3 are not exposed outside only to be encased and protected by the cover 33c at the cage, as illustrated in FIGS. 13 and 14.

As a result, when the present embodiment is applied, the coupling process where the magnets 3 are previously coupled to the cage 33 may be used in to following varied methods.

In other words, the method by which the magnets are coupled to the insert grooves at the cage 33 by way of adhesives, the method by which the magnets 3 are forcibly inserted into the plurality of insert grooves formed at the case in smaller size than the size of the magnets 3, the method by which the magnets 3 are forcibly inserted into the plurality of prominences and depressions 33b equipped at the plurality of insert grooves at the cage as illustrated in FIG. 11, and the method by which the above-noted methods are combined (such as simultaneous use of forcible insertion by the prominences and depressions and adhesives) can be utilized.

Of course, in the method where adhesives are used for coupling, gaps can be formed between the insert grooves and magnets as illustrated in the afore said embodiments to thereby enable the adhesives to slip into the gaps, resulting in a better sturdier coupling state.

As apparent from the foregoing, there is an advantage in the magnet fixing method of a linear servo motor thus described according to the present invention in that a cage for simultaneously securing positions and angles of a plurality of magnets is injection-molded where the cage is utilized to fix the magnets such that productivity is improved to shorten the working hours and reduce the manufacturing cost as well.

There is another advantage in that a mutual twisting phenomenon can be prevented by interacting magnetic force among the plurality of magnets to thereby reduce the rates of defects.

We claim:

1. A magnet fixing method of a linear servo motor, the motor comprising a stator composed of a plurality of magnets coupled to an upper surface of a stator body via a pure iron plate and a mover composed of a coil until coupled to a lower surface of a mover body, where the mover is horizontally moved on the stator by thrusts induced between the coil until and the plurality of magnets, the method comprising the steps of:

injection-molding a cage formed with a plurality of insert holes grooves continuously arranged at a predetermined interval wherein the insert grooves are formed as deep as the magnets can be inserted;

coupling a plurality of magnets into the plurality of insert grooves formed on the cage in an alternative method; and attaching the cage and the plurality of the magnets assembled by the coupling step to an upper surface of the pure iron plate simultaneously, by way of adhesives, wherein the cage encases and protects the magnets from being exposed outside.

2. The method as defined in claim 1, wherein the coupling step involves coupling the magnets to the plurality of insert grooves formed at the cage by way of adhesives.

3. The method as defined in claim 1, wherein the coupling step involves push-fitting the magnets into the plurality of grooves formed at the cage in smaller size than those of the magnets.

4. The method as defined in claim 1, wherein the coupling step involves push-fitting the magnets into a plurality of prominences and depressions formed at the plurality of insert grooves at the cage.

* * * * *